(12) United States Patent
Shahana

(10) Patent No.: US 11,597,471 B2
(45) Date of Patent: Mar. 7, 2023

(54) HUMAN-POWERED VEHICLE CONTROL DEVICE

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 176 days.

(21) Appl. No.: 17/130,569

(22) Filed: Dec. 22, 2020

(65) Prior Publication Data

US 2021/0197925 A1    Jul. 1, 2021

(30) Foreign Application Priority Data

Dec. 27, 2019 (JP) .............................. JP2019-238273

(51) Int. Cl.
B62M 6/50    (2010.01)

(52) U.S. Cl.
CPC ..................................... B62M 6/50 (2013.01)

(58) Field of Classification Search
CPC ....................................................... B62M 6/50
USPC ....................................................... 180/206.2
See application file for complete search history.

(56) References Cited

U.S. PATENT DOCUMENTS

| | | | | |
|---|---|---|---|---|
| 4,364,448 A * | 12/1982 | Ikuma | ...................... | B62M 6/25 701/93 |
| 5,474,148 A * | 12/1995 | Takata | ..................... | B60L 15/20 280/214 |
| 5,777,442 A * | 7/1998 | Miyata | ..................... | B62M 6/55 180/219 |
| 6,957,129 B2 * | 10/2005 | Hatanaka | ................ | B62M 6/65 701/1 |
| 10,035,559 B2 * | 7/2018 | Tsuchizawa | ............. | B62M 6/50 |
| 10,144,485 B2 * | 12/2018 | Stegmaier | .............. | B60L 15/20 |
| 10,421,519 B2 * | 9/2019 | Tsuchizawa | ............. | B62M 6/50 |
| 11,124,267 B2 * | 9/2021 | Shahana | ................ | B62M 23/02 |
| 11,383,790 B2 * | 7/2022 | Tsuchizawa | ............. | B62M 6/50 |
| 2016/0251057 A1 | 9/2016 | Stegmaier | | |
| 2018/0009503 A1 * | 1/2018 | Kin | ......................... | B62M 6/55 |
| 2020/0262511 A1 * | 8/2020 | Hahn | ....................... | B62M 6/50 |
| 2022/0204129 A1 * | 6/2022 | Shahana | ................ | B62M 6/50 |

FOREIGN PATENT DOCUMENTS

| | | | | |
|---|---|---|---|---|
| CN | 1205954 A | | 1/1999 | |
| DE | 102018123529 A1 * | | 4/2019 | ............. B60L 15/20 |
| JP | 8-150982 A | | 6/1996 | |
| JP | 11-34966 A | | 2/1999 | |
| JP | 2001-63679 A | | 3/2001 | |

(Continued)

*Primary Examiner* — Jacob B Meyer
*Assistant Examiner* — Hosam Shabara
(74) *Attorney, Agent, or Firm* — Global IP Counselors, LLP

(57) ABSTRACT

A human-powered vehicle control device for a human-powered vehicle includes an electronic controller configured to control a motor, which applies a propulsion force to a human-powered vehicle, in correspondence with a human driving force input to the human-powered vehicle. The electronic controller is configured to control the motor so as to increase an assist force produced by the motor for when an output of the motor is maximal upon determining a parameter related to at least one of a vehicle speed of the human-powered vehicle, an inclination angle of the human-powered vehicle, and a travel resistance of the human-powered vehicle has increased.

18 Claims, 7 Drawing Sheets

(56) References Cited

FOREIGN PATENT DOCUMENTS

| JP | 2019-194061 A | | 11/2019 |
|---|---|---|---|
| JP | 2020199992 A | * | 12/2020 |
| WO | WO-2017175529 A1 | * | 10/2017 |

* cited by examiner

HUMAN-POWERED VEHICLE CONTROL DEVICE

CROSS-REFERENCE TO RELATED APPLICATIONS

This application claims priority to Japanese Patent Application No. 2019-238273, filed on Dec. 27, 2019. The entire disclosure of Japanese Patent Application No. 2019-238273 is hereby incorporated herein by reference.

BACKGROUND

Technical Field

The present invention generally relates to a human-powered vehicle control device for a human-powered vehicle.

Background Information

Japanese Laid-Open Patent Publication No. 2001-063679 (Patent document 1) discloses an example of a control device for a human-powered vehicle that increases the rotational speed of a motor as the vehicle speed of the human-powered vehicle increases. As the rotational speed of the motor increases, the output torque of the motor will decrease, which may result in the rider feeling a lack in assist force.

SUMMARY

One object of the present disclosure is to provide a human-powered vehicle control device for a human-powered vehicle that executes motor control so that the rider seldom feels a lack in assist force.

A human-powered vehicle control device for a human-powered vehicle in accordance with a first aspect of the present disclosure comprises an electronic controller configured to control a motor, which applies a propulsion force to a human-powered vehicle, in correspondence with a human driving force input to the human-powered vehicle. The electronic controller is configured to control the motor so as to increase an assist force produced by the motor for when an output of the motor is maximal upon determining a parameter related to at least one of a vehicle speed of the human-powered vehicle, an inclination angle of the human-powered vehicle, and a travel resistance of the human-powered vehicle has increased.

The human-powered vehicle control device in accordance with the first aspect is configured to control the motor so as to increase the assist force produced by the motor for when an output of the motor is maximal in a case where a parameter related to at least one of a vehicle speed of the human-powered vehicle, an inclination angle of the human-powered vehicle, and a travel resistance of the human-powered vehicle is increased. This allows the motor to be controlled so that the rider seldom feels a lack in assist force.

In accordance with a second aspect of the present disclosure, in the human-powered vehicle control device according to the first aspect, the parameter includes a first parameter related to the vehicle speed. The electronic controller is configured to control the motor so that the assist force produced by the motor is less than or equal to a first value upon determining the vehicle speed is lower than or equal to a first vehicle speed and control the motor so that the assist force produced by the motor is less than or equal to a second value upon determining the vehicle speed is higher than the first vehicle speed. The second value is larger than the first value.

With the human-powered vehicle control device in accordance with the second aspect, the assist force produced by the motor in a case where the vehicle speed is higher than the first vehicle speed is greater than the assist force produced by the motor in a case where the vehicle speed is lower than or equal to a first vehicle speed. This allows the motor to be controlled so that the rider seldom feels a lack in assist force in a case where the vehicle speed is higher than the first vehicle speed.

In accordance with a third aspect of the present disclosure, in the human-powered vehicle control device in accordance with the second aspect, the electronic controller is configured to control the motor so that the assist force produced by the motor is less than or equal to a third value upon determining the vehicle speed is higher than a second vehicle speed. The second vehicle speed is higher than the first vehicle speed, and the third value is smaller than the second value.

With the human-powered vehicle control device in accordance with the third aspect, the assist force produced by the motor in a case where the vehicle speed is higher than the second vehicle speed is less than the assist force produced by the motor in a case where the vehicle speed is lower than or equal to the second vehicle speed. This reduces the electric power consumed by the motor in a case where the vehicle speed is higher than the second vehicle speed.

In accordance with a fourth aspect of the present disclosure, the human-powered vehicle control device in accordance with the third aspect is configured so that the third value decreases as the vehicle speed increases.

With the human-powered vehicle control device in accordance with the fourth embodiment, in a case where the vehicle speed is higher than the second vehicle speed, the assist force produced by the motor is decreased as the vehicle speed increases.

In accordance with a fifth aspect of the present disclosure, in the human-powered vehicle control device in accordance with the third or fourth aspect, the electronic controller is configured to control the motor so as to increase the assist force produced by the motor for when the output of the motor is maximal as the parameter increases upon determining the vehicle speed is less than or equal to the second vehicle speed.

With the human-powered vehicle control device in accordance with the fifth aspect, in a case where the vehicle speed is less than or equal to the second vehicle speed, the assist force produced by the motor for when the output of the motor is maximal is increased as the parameter increases.

In accordance with a sixth aspect of the present disclosure, in the human-powered vehicle control device in accordance with the first aspect, the parameter includes a first parameter related to the vehicle speed and a second parameter related to at least one of the inclination angle and the travel resistance. The electronic controller is configured not to change the assist force produced by the motor for when the output of the motor is maximal upon determining the second parameter does not increase even if the first parameter increases.

With the human-powered vehicle control device in accordance with the sixth aspect, the assist force produced by the motor for when the output of the motor is maximal is set in a manner suitable for a case where the first parameter increases, a case where the second parameter increases, and a case where the second parameter does not increase.

In accordance with a seventh aspect of the present disclosure, in the human-powered vehicle control device according to any one of the second to fifth aspects, the parameter includes the first parameter and a second parameter including at least one of the inclination angle and the travel resistance, and the electronic controller is configured not to change the assist force produced by the motor for when the output of the motor is maximal upon determining the second parameter does not increase even if the first parameter increases.

With the human-powered vehicle control device in accordance with the seventh aspect, the assist force produced by the motor for when the output of the motor is maximal is set in a manner suitable for a case where the first parameter increases, a case where the second parameter increases, and a case where the second parameter does not increase.

In accordance with an eighth aspect of the present disclosure, in the human-powered vehicle control device according to the sixth or seventh aspect, the electronic controller is configured to control the motor so that the assist force produced by the motor is less than or equal to a fourth value upon determining the first parameter is less than or equal to a first threshold value and the second parameter is less than or equal to a second threshold value. The electronic controller is configured to control the motor so that the assist force produced by the motor is less than or equal to the fourth value if the first parameter is greater than the first threshold value upon determining the second parameter is less than or equal to the second threshold value. The electronic controller is configured to control the motor so that the assist force produced by the motor is less than or equal to a fifth value if the first parameter is greater than the first threshold value upon determining the second parameter is greater than the second threshold value. The fifth value is larger than the fourth value.

With the human-powered vehicle control device in accordance with the eighth aspect, the maximum value of the assist force produced by the motor if the first parameter is greater than the first threshold value in a case where the second parameter is greater than the second threshold value is larger than the maximum value of the assist force produced by the motor in a case where the second parameter is less than or equal to the second threshold value regardless of the value of the first parameter.

In accordance with a ninth aspect of the present disclosure, in the human-powered vehicle control device according to the eighth aspect, the electronic controller is configured to control the motor so that the assist force produced by the motor is less than or equal to a sixth value upon determining the first parameter is greater than a third threshold value. The third threshold value is larger than the first threshold value, and the sixth value is smaller than the fifth value.

With the human-powered vehicle control device in accordance with the ninth aspect, the maximum value of the assist force produced by the motor if the first parameter is greater than the first threshold value in a case where the second parameter is greater than the second threshold value is larger than the maximum value of the assist force produced by the motor in a case where the first parameter is greater than the third threshold value.

A human-powered vehicle control device for a human-powered vehicle in accordance with a tenth aspect comprises an electronic controller configured to control a motor, which applies a propulsion force to a human-powered vehicle, in correspondence with a human driving force input to the human-powered vehicle. The electronic controller is configured to control the motor so as to increase a ratio of an assist force produced by the motor to the human driving force if a vehicle speed of the human-powered vehicle increases upon determining the vehicle speed of the human-powered vehicle is in a first range that is higher than 15 kilometers per hour.

With the human-powered vehicle control device in accordance with the tenth aspect, the motor is controlled to increase the ratio of the assist force produced by the motor to the human driving force if the vehicle speed of the human-powered vehicle increases in a case where the vehicle speed of the human-powered vehicle is in the first range that is higher than 15 kilometers per hour. This allows the motor to be controlled so that the rider seldom feels a lack in assist force.

In accordance with an eleventh aspect of the present disclosure, in the human-powered vehicle control device according to the tenth aspect, the electronic controller is configured to control the motor so as to decrease the ratio as the vehicle speed increases upon determining the vehicle speed is in a second range that is higher than the first range.

With the human-powered vehicle control device in accordance with the eleventh embodiment, in a case where the vehicle speed is in the second range, the electric power consumed by the motor is reduced.

In accordance with a twelfth aspect of the present disclosure, in the human-powered vehicle control device according to the eleventh aspect, the second range includes a region that is higher than 25 kilometers per hour.

With the human-powered vehicle control device in accordance with the twelfth aspect, in the human-powered vehicle control device according to the eleventh aspect, the electric power consumed by the motor is reduced in a case where the vehicle speed is in a region that is higher than 25 kilometers per hour.

In accordance with a thirteenth aspect of the present disclosure, in the human-powered vehicle control device according to any one of the tenth to twelfth aspects, the electronic controller is configured to change the ratio in correspondence with a parameter related to at least one of a vehicle speed of the human-powered vehicle, an inclination angle of the human-powered vehicle, and a travel resistance of the human-powered vehicle upon determining the vehicle speed is in the first range.

With the human-powered vehicle control device in accordance with the thirteenth aspect, the ratio is optimally changed in accordance with at least one of the vehicle speed of the human-powered vehicle, the inclination angle of the human-powered vehicle, and the travel resistance of the human-powered vehicle in a case where the vehicle speed is in the first range.

In accordance with a fourteenth aspect of the present disclosure, in the human-powered vehicle control device according to the thirteenth aspect, the parameter includes at least one of a first parameter related to the vehicle speed, a second parameter related to the inclination angle, and a third parameter related to the travel resistance.

With the human-powered vehicle control device in accordance with the fourteenth aspect, the ratio is optimally changed in accordance with at least one of the first parameter related to the vehicle speed, the second parameter related to the inclination angle, and the third parameter related to the travel resistance.

In accordance with a fifteenth aspect of the present disclosure, in the human-powered vehicle control device according to the fourteenth aspect, the parameter includes the first parameter, and the electronic controller is configured to control the motor so as to increase the ratio as the vehicle speed increases upon determining the vehicle speed is in the first range.

With the human-powered vehicle control device in accordance with the fifteenth aspect, the motor is controlled to increase the ratio as the first parameter, which is related to the vehicle speed, increases in a case where the vehicle speed is in the first range. This allows the motor to be controlled so that the rider seldom feels a lack in assist force.

In accordance with a sixteenth aspect of the present disclosure, in the human-powered vehicle control device according to the fourteenth or fifteenth aspect, the parameter includes the second parameter, and the electronic controller is configured to control the motor so as to increase the ratio as the vehicle speed increases upon determining the vehicle speed is in the first range.

With the human-powered vehicle control device in accordance with the sixteenth aspect, the motor is controlled to increase the ratio as the second parameter, which is related to the inclination angle, increases in a case where the vehicle speed is in the first range. This allows the motor to be controlled so that the rider seldom feels a lack in assist force.

In accordance with a seventeenth aspect of the present disclosure, in the human-powered vehicle control device according to any one of the fourteenth to sixteenth aspects, the parameter includes the third parameter, and the electronic controller is configured to control the motor so as to increase the ratio as the third parameter increases upon determining the vehicle speed is in the first range.

With the human-powered vehicle control device in accordance with the seventeenth aspect, the motor is controlled to increase the ratio as the third parameter, which is related to the travel resistance, increases in a case where the vehicle speed is in the first range. This allows the motor to be controlled so that the rider seldom feels a lack in assist force.

In accordance with an eighteenth aspect of the present disclosure, in the human-powered vehicle control device according to any one of the fourteenth to seventeenth aspects, the parameter includes the second parameter, and the electronic controller is configured not to change the ratio even if the vehicle speed of the human-powered vehicle increases upon determining the vehicle speed is in the first range and the second parameter is less than or equal to a predetermined fourth threshold value.

With the human-powered vehicle control device in accordance with the eighteenth aspect, the ratio is not changed even if the vehicle speed of the human-powered vehicle increases in a case where the vehicle speed of the human-powered vehicle is in the first range and the second parameter, which is related to the inclination angle, is less than or equal to the predetermined fourth threshold value. This reduces the electric power consumed by the motor.

In accordance with a nineteenth aspect of the present disclosure, in the human-powered vehicle control device according to any one of the fourteenth to eighteenth aspects, the parameter includes the third parameter, and the electronic controller is configured not to change the ratio even if the vehicle speed of the human-powered vehicle increases upon determining the vehicle speed is in the first range and the third parameter is less than or equal to a fifth threshold value.

With the human-powered vehicle control device in accordance with the nineteenth aspect, the ratio is not changed even if the vehicle speed of the human-powered vehicle increases in a case where the vehicle speed of the human-powered vehicle is in the first range and the third parameter, which is related to the travel resistance, is less than or equal to the fifth threshold value. This reduces the electric power consumed by the motor.

The human-powered vehicle control device for a human-powered vehicle in accordance with the present disclosure executes motor control so that the rider seldom feels a lack in assist force.

BRIEF DESCRIPTION OF THE DRAWINGS

Referring now to the attached drawings which form a part of this original disclosure.

DETAILED DESCRIPTION OF EMBODIMENTS

Figure 1:
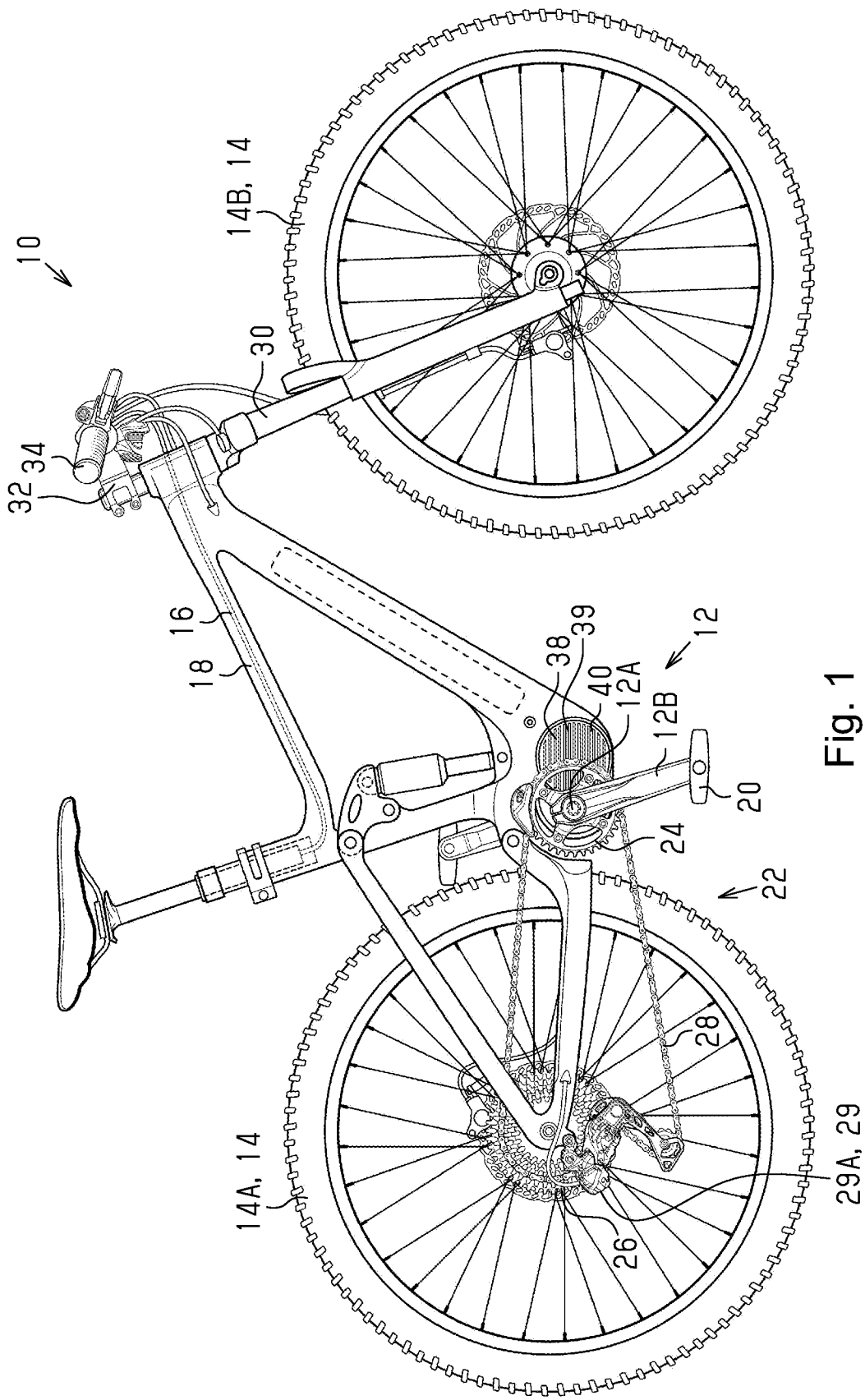
FIG. 1 is a side elevational view of a human-powered vehicle including a human-powered vehicle control device in accordance with one embodiment.

Selected embodiments will now be explained with reference to the drawings. It will be apparent to those skilled in the human-powered field from this disclosure that the following descriptions of the embodiments are provided for illustration only and not for the purpose of limiting the invention as defined by the appended claims and their equivalents.

Embodiment

A human-powered vehicle control device 60 for a human-powered vehicle in accordance with one embodiment will now be described with reference to FIGS. 1 to 7. The human-powered vehicle 10 is a vehicle that includes at least one wheel and is driven by at least a human driving force H. The human-powered vehicle 10 includes, for example, various types of bicycles such as a mountain bike, a road bike, a city bike, a cargo bike, a handcycle, and a recumbent bike. The number of wheels of the human-powered vehicle 10 is not limited. The human-powered vehicle 10 includes, for example, a monocycle and vehicles having three or more wheels. The human-powered vehicle 10 is not limited to a vehicle driven only by a human driving force H. The human-powered vehicle 10 includes an e-bike that uses not only a human driving force H but also a drive force of an electric motor for propulsion. An e-bike includes an electric assist bicycle that assists in propulsion of the vehicle with an electric motor. In the description hereafter, the human-powered vehicle 10 refers to an electric assist bicycle.

The human-powered vehicle 10 includes a crank 12 to which the human driving force H is input. The human-powered vehicle 10 further includes a pair of wheels 14 and a body 16. The wheels 14 include a rear wheel 14A and a front wheel 14B. The body 16 includes a frame 18. The crank 12 includes an input rotational shaft 12A, which is rotatable relative to the frame 18, and two crank arms 12B, which are respectively provided on the axial ends of the input rotational shaft 12A. In the present embodiment, the input rotational shaft 12A is a crank axle. A pedal 20 is coupled to each of the crank arms 12B. The crank 12 is rotated to drive the rear wheel 14A. The rear wheel 14A is supported by the frame 18. The crank 12 and the rear wheel 14A are coupled by a drive mechanism 22. The drive mechanism 22 includes a first rotational body 24 coupled to the input rotational shaft 12A. The input rotational shaft 12A and the first rotational body 24 can be coupled to rotate integrally or coupled by a first one-way clutch. The first one-way clutch is configured to rotate the first rotational body 24 forward in a case in which the crank 12 is rotated forward and permit relative rotation of the crank 12 and the first rotational body 24 in a case in which the crank 12 is rotated backward. The first rotational body 24 includes a sprocket, a pulley, or a bevel gear. The drive mechanism 22 includes a second rotational body 26 and a linking member 28. The linking member 28 transmits the rotational force of the first rotational body 24 to the second rotational body 26. The linking member 28 includes, for example, a chain, a belt, or a shaft.

The second rotational body 26 is coupled to the rear wheel 14A. The second rotational body 26 includes a sprocket, a pulley, or a bevel gear. Preferably, a second one-way clutch is provided between the second rotational body 26 and the rear wheel 14A. The second one-way clutch is configured to rotate the rear wheel 14A forward in a case where the second rotational body 26 is rotated forward and permit relative rotation of the second rotational body 26 and the rear wheel 14A in a case where the second rotational body 26 is rotated backward. The human-powered vehicle 10 can include a transmission 29. The transmission 29 includes at least one of an external shifting device and an internal geared hub. The external shifting device includes, for example, a derailleur 29A, the first rotational body 24, and the second rotational body 26. The derailleur 29A includes at least one of a front derailleur and a rear derailleur. The first rotational body 24 can include a plurality of sprockets. The second rotational body 26 can include a plurality of sprockets. The internal gear hub may be provided, for example, in a hub of the rear wheel 14A or in a power transmission path extending from the input rotational shaft 12A to the first rotational body 24.

The front wheel 14B is attached to the frame 18 by a front fork 30. A handlebar 34 is coupled to the front fork 30 by a stem 32. In the present embodiment, the rear wheel 14A is linked to the crank 12 by the drive mechanism 22. However, at least one of the rear wheel 14A and the front wheel 14B can be linked to the crank 12 by the drive mechanism 22.

Preferably, the human-powered vehicle 10 further includes a battery 36. The battery 36 includes one or more battery cells. The battery cells include rechargeable batteries. The battery 36 is configured to supply electric power to a human-powered vehicle control device 60. Preferably, the battery 36 is connected to an electronic controller 62 of the human-powered vehicle control device 60 by an electrical cable or a wireless communication device in a manner allowing for communication. The battery 36 is connected by, for example, power line communication (PLC), Controller Area Network (CAN), or Universal Asynchronous Receiver-Transmitter (UART) to the controller 62 in a manner allowing for communication.

The human-powered vehicle 10 includes a motor 38. The motor 38 applies a propulsion force to the human-powered vehicle 10. The motor 38 includes one or more electric motors. The electric motor is, for example, a brushless motor. The motor 38 is configured to transmit a rotational force to at least one of the front wheel 14B and a power transmission path of the human driving force H extending from the pedals 20 to the rear wheel 14A. The power transmission path of the human driving force H extending from the pedals 20 to the rear wheel 14A includes the rear wheel 14A. In the present embodiment, the motor 38 is provided on the frame 18 of the human-powered vehicle 10 and configured to transmit rotation to the first rotational body 24. The motor 38 is provided on a housing 39. The housing 39 is provided on the frame 18. The housing 39 is provided on the frame 18, for example, in an attachable and detachable manner. The motor 38 and the housing 39 of the motor 38 form a drive unit 40. Preferably, a third one-way clutch is provided in a power transmission path extending between the motor 38 and the input rotational shaft 12A to limit the rotational force of the crank 12 transmitted to the motor 38 in a case where the input rotational shaft 12A is rotated in a direction in which the human-powered vehicle 10 moves forward. In a case where the motor 38 is provided on at least one of the rear wheel 14A and the front wheel 14B, the motor 38 can be provided on the hub to form a hub motor with the hub.

Figure 2:
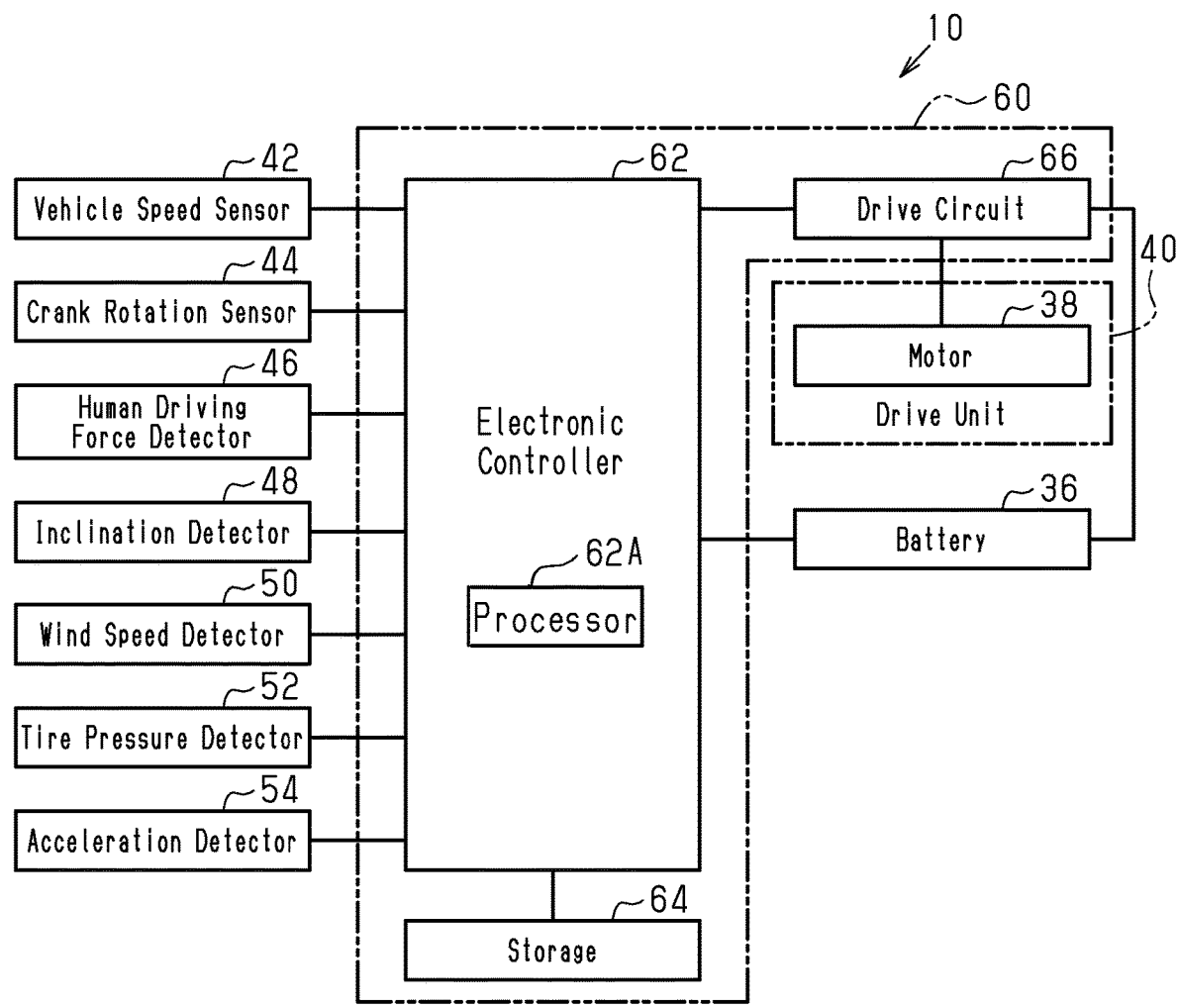
FIG. 2 is a block diagram showing the electrical configuration of the human-powered vehicle including the human-powered vehicle control device in accordance with the embodiment.

The human-powered vehicle control device 60 includes the electronic controller 62. The electronic controller 62 includes at least one processor 62A that executes a predetermined control program. The processor 62A includes, for example, a central processing unit (CPU) or a micro-processing unit (MPU). The term "electronic controller" as used herein refers to hardware that executes a software program, and does not include a human. For the sake of brevity, the electronic controller 62 shall hereinafter be simply referred to as "the controller 62". The processor 62A includes, for example, an arithmetic processing unit. While only one processor is illustrated in FIG. 2, it will be apparent from this disclosure that several processors can be used. When several processors are used, the processors can be provided at a plurality of separate positions. The controller 62 can include one or more microcomputers. Preferably, the human-powered vehicle control device 60 further includes storage 64. The storage 64 stores information used for various control programs and various control processes. The storage 64 includes any computer storage device or any non-transitory computer-readable medium with the sole exception of a transitory, propagating signal. For example, the storage 74 includes a nonvolatile memory and a volatile memory. The nonvolatile memory includes, for example, at least one of a read-only memory (ROM), an erasable programmable read-only memory (EPROM), an electrically erasable programmable read-only memory (EEPROM), and a flash memory. The nonvolatile memory includes, for example, a random access memory (RAM).

Preferably, the human-powered vehicle control device 60 further includes a drive circuit 66 of the motor 38. Preferably, the drive circuit 66 and the controller 62 are provided on the housing 39 of the drive unit 40. The drive circuit 66 and the controller 62 can be provided on, for example, the same circuit substrate. The drive circuit 66 includes an inverter circuit. The drive circuit 66 controls the electric power supplied from the battery 36 to the motor 38. The drive circuit 66 is connected to the controller 62 by a conductive wire, an electric cable, or a wireless communication device. The drive circuit 66 drives the motor 38 in accordance with a control signal from the controller 62.

Preferably, the human-powered vehicle 10 further includes a vehicle speed sensor 42. Preferably, the human-powered vehicle 10 includes a crank rotation sensor 44, a human driving force detector 46, an inclination detector 48, a wind speed detector 50, a tire pressure detector 52, and an acceleration detector 54. The term "sensor" as used herein also refers to a hardware device or instrument designed to detect the presence of a particular object or substance and to emit a signal in response. The term "sensor" as used herein also do not include a human. Likewise, the term "detector" as used herein refers to a hardware device or instrument designed to detect the presence of a particular object or substance and to emit a signal in response. The term "detector" as used herein do not include a human.

The vehicle speed sensor 42 is configured to detect information related to the vehicle speed V of the human-powered vehicle 10. In the present embodiment, the vehicle speed sensor 42 is configured to detect information related to the rotational speed W of the wheels 14 of the human-powered vehicle 10. The vehicle speed sensor 42 is configured to detect, for example, a magnet provided on a wheel 14 of the human-powered vehicle 10. The vehicle speed sensor 42 is configured to output, for example, a predetermined number of detection signals during a single rotation of the wheel 14. The predetermined number is, for example, one. The vehicle speed sensor 42 outputs a signal corresponding to the rotational speed of the wheel 14. The controller 62 can calculate the vehicle speed V of the human-powered vehicle 10 from the rotational speed W of the wheel 14 and information related to the circumferential length of the wheel 14. The storage 64 stores information related to the circumferential length of the wheel 14. The vehicle speed sensor 42 includes, for example, a magnetic reed, which forms a reed switch, or a Hall element. The vehicle speed sensor 42 can be attached to a chain stay of the frame 18 of the human-powered vehicle 10 and configured to detect a magnet attached to the rear wheel 14A. Alternatively, the vehicle speed sensor 42 can be provided on the front fork 30 to detect a magnet attached to the front wheel 14B. In the predetermined embodiment, the vehicle speed sensor 42 is configured so that a reed switch detects a magnet once during a single rotation of the wheel 14. The vehicle speed sensor 42 is not limited to a structure that detects a magnet provided on the wheel 14 as long as information related to the vehicle speed V of the human-powered vehicle 10 can be obtained. For example, the vehicle speed sensor 42 can be configured to detect a slit provided on a disc brake. Alternatively, the vehicle speed sensor 42 can include an optical sensor or a Global Positioning System (GPS) receiver. The vehicle speed sensor 42 is connected to the controller 62 by a wireless communication device or an electric cable.

The crank rotation sensor 44 is configured to detect information related to the rotational speed NC of the input rotational shaft 12A. The crank rotation sensor 44 is provided on, for example, the frame 18 of the human-powered vehicle 10 or the drive unit 40. The crank rotation sensor 44 includes a magnetic sensor that outputs a signal corresponding to magnetic field intensity. An annular magnet of which the magnetic field intensity varies in the circumferential direction is provided on the input rotational shaft 12A, on a member rotated in cooperation with the input rotational shaft 12A, or in a power transmission path extending from the input rotational shaft 12A to the first rotational body 24. The member rotated in cooperation with the input rotational shaft 12A can include an output shaft of the motor 38. The crank rotation sensor 44 outputs a signal corresponding to the rotational speed NC of the input rotational shaft 12A. The magnet can be provided on a member rotated integrally with the input rotational shaft 12A in a power transmission path of the human driving force H extending from the input rotational shaft 12A to the first rotational body 24. For example, in a case where the first one-way clutch is not provided between the input rotational shaft 12A and the first rotational body 24, the magnet can be provided on the first rotational body 24. Instead of the magnetic sensor, the crank rotation sensor 44 can include an optical sensor, an acceleration sensor, a gyro sensor, or a torque sensor as long as information related to the rotational speed NC of the input rotational shaft 12A can be obtained. The crank rotation sensor 44 is connected to the controller 62 by a wireless communication device or an electric cable.

The human driving force detector 46 is configured to detect information related to the human driving force H. The human driving force detector 46 includes, for example, a torque sensor. The torque sensor is configured to output a signal corresponding to the torque applied to the crank 12 by the human driving force H. Preferably, in a case where, for example, the first one-way clutch is provided in the power transmission path, the torque sensor is provided in the power transmission path at an upstream side of the first one-way clutch. The torque sensor includes a strain sensor, a magnetostrictive sensor, or a pressure sensor. The strain sensor includes a strain gauge. The torque sensor is provided in the power transmission path or in the vicinity of a member included in the power transmission path. The member included in the power transmission path is, for example, the input rotational shaft 12A, a member that transmits human driving force H between the input rotational shaft 12A and the first rotational body 24, the crank arms 12B, or the pedals 20. The torque sensor is connected to the controller 62 by a wireless communication device or an electric cable. The human driving force detector 46 can include, for example, a sensor that detects the pressure applied to the pedals 20 or a sensor that detects the tension of the chain as long as information related to the human driving force H can be obtained.

The inclination detector 48 is configured to detect information related to the inclination angle D of the human-powered vehicle 10. The inclination detector 48 is further configured to detect information related to the travel resistance R of the human-powered vehicle 10. The inclination angle D of the human-powered vehicle 10 relates to the travel resistance R of the human-powered vehicle 10. The inclination detector 48 is configured to detect the inclination angle D of the human-powered vehicle 10. The inclination angle D of the human-powered vehicle 10 is an inclination angle in the moving direction of the human-powered vehicle 10. The inclination angle D of the human-powered vehicle 10 corresponds to the pitch angle of the human-powered vehicle 10. In one example, the inclination detector 48 includes an inclination sensor. The inclination sensor includes at least one of a gyro sensor and an acceleration sensor. In another example, the inclination detector 48 includes a Global positioning system (GPS). The controller 62 can calculate the inclination angle D of the human-powered vehicle 10 from the GPS information obtained by the GPS receiver and the gradient included in map information that is recorded in advance in the storage 64. The inclination detector 48 is connected to the controller 62 by a wireless communication device or an electric cable.

The wind speed detector 50 is configured to detect information related to the travel resistance R of the human-powered vehicle 10. The wind speed detector 50 is configured to detect the wind speed. The wind speed detector 50 includes at least one of a wind speed sensor and a wind pressure sensor. The wind speed detector 50 is provided, for example, on the handlebar 34 of the human-powered vehicle 10. Preferably, the wind speed detector 50 is configured to detect at least one of a headwind and a tailwind in a case where the human-powered vehicle 10 is traveling forward. The wind speed detector 50 is connected to the controller 62 by a wireless communication device or an electric cable.

The tire pressure detector 52 is configured to detect information related to the travel resistance R of the human-powered vehicle 10. The tire pressure detector 52 is configured to detect the air pressure of the tire of each wheel 14. The tire pressure detector 52 is configured to detect the air pressure inside a tire. The tire pressure detector 52 includes a pressure sensor and is provided, for example, on an inlet valve of a wheel 14 or an inner wall of a tire. The tire pressure detector 52 is connected to the controller 62 by a wireless communication device or an electric cable.

The acceleration detector 54 is configured to detect information related to the travel resistance R of the human-powered vehicle 10. The acceleration detector 54 is configured to detect a signal corresponding to the acceleration in the direction in which the human-powered vehicle 10 moves forward. The acceleration detector 54 includes an acceleration sensor. The acceleration detector 54 is connected to the controller 62 by a wireless communication device or an electric cable. The acceleration detector 54 can include the vehicle speed sensor 42 instead of the acceleration sensor. In a case where the vehicle speed sensor 42 is included, the acceleration detector 54 differentiates the vehicle speed V to obtain the acceleration in the direction in which the human-powered vehicle 10 moves forward.

The controller 62 is configured to control the motor 38. The controller 62 is configured to control the motor 38 in accordance with the human driving force H input to the human-powered vehicle 10. The human driving force H can be expressed by torque or power. In a case where the human driving force H is expressed by power, the human driving force H is obtained by multiplying the torque detected with the human driving force detector 46 by the rotational speed NC of the input rotational shaft 12A detected with the crank rotation sensor 44.

The controller 62 is configured to control the motor 38 so that the assist force M produced by the motor 38 to the human driving force H becomes equal to a predetermined ratio A. The predetermined ratio A is not fixed and can be changed, for example, in accordance with the human driving force H, in accordance with the vehicle speed V, and in accordance with both of the human driving force H and the vehicle speed V. The human driving force H and the assist force M can be expressed by torque or power. In a case where the human driving force H and the assist force M are expressed by torque, the human driving force H is referred to as the human torque TH, and the assist force M is referred to as the assist torque TM. In a case where the human driving force H and the assist force M are expressed by power, the human driving force H is referred to as the human power WH, and the assist force M is referred to as the assist power WM. The torque ratio of the assist torque TM to the human torque TH in the human-powered vehicle 10 may be referred to as the assist ratio AT. The ratio of the assist power WM to the human power WH produced by the motor 38 may be referred to as the assist ratio AW.

The controller 62 is configured to control the motor 38 in, for example, one control state selected from control states that at least partially differ in the corresponding relationship of the human driving force H and the predetermined ratio A. In a case where the output of the motor 38 is input to the first rotational body 24, the human power WH is calculated by, for example, multiplying the human torque TH by the rotational speed NC of the input rotational shaft 12A. In a case where the output of the motor 38 is input via a speed reducer to the first rotational body 24, the output of the speed reducer is referred to as the assist force M. If the output of the motor 38 is input to the first rotational body 24 in a case where the power transmission path extending from the motor 38 to the first rotational body 24 does not include a speed reducer, the assist power WM is calculated by, for example, multiplying the output torque of the motor 38 by the rotational speed of the motor 38. In a case where the output of the motor 38 is input via a speed reducer to the first rotational body 24, the assist power WM is calculated by, for example, multiplying the output torque of the speed reducer by the output rotational speed of the speed reducer. In a case where there is a speed reducer, the storage 64 is configured to store information related to the speed reduction ratio of the speed reducer. The controller 62 can calculate the rotational speed of the speed reducer from information related to the rotational speed of the motor 38 and the speed reduction ratio of the speed reducer. The storage 64 stores, for example, information related to the relationship of control instructions of the motor 38 and the output torque of the motor 38. The controller 62 can calculate the output torque of the motor 38 from, for example, information stored in the storage 64 and indicating the relationship of control instructions of the motor 38 and the output torque of the motor 38. The controller 62 can calculate the output torque of the speed reducer from, for example, the output torque of the motor 38 and information related to the speed reduction ratio of the speed reducer. The controller 62 is configured to output control instructions to the drive circuit 66 of the motor 38 in accordance with the human torque TH or the human power WH. The control instructions include, for example, a torque instruction value. The control states can include a control state that does not drive the motor 38.

In a case where the motor 38 is provided on a wheel 14, the assist ratio AT is the ratio of the assist torque applied to the wheel 14 driven by the motor 38 to the human torque applied to the wheel 14 driven by the human driving force H. The human torque applied to the wheel 14 driven by the human driving force H is calculated from the rotational torque of the input rotational shaft 12A, the transmission ratio of the transmission 29, and the radius of the wheel 14. The storage 64, for example, stores information related to the transmission ratio of the transmission 29 and information related to the radius of the wheels 14. The assist torque of the wheel 14 driven by the motor 38 can be calculated from the rotational torque of the output shaft of the motor 38, the speed reduction ratio of the speed reducer, and the radius of the wheel 14. The storage 64 stores, for example, information related to the speed reduction ratio of the speed reducer and information related to the radius of the wheel 14. In a case where the motor 38 is provided on the wheel 14, the radius of the wheel 14 is not used to calculate the assist ratio AT and thus can be omitted.

The controller 62 is configured to control the motor 38 so that the assist force M is less than or equal to an upper limit value MX. The controller 62 is configured to control the motor 38 so that the assist torque TM is less than or equal to an upper limit value TMX in a case where the output of the motor 38 is input to the first rotational body 24 and the assist force M is expressed by torque. Preferably, the upper limit value TMX is a value in a range of 30 Nm or greater and 200 Nm or less. The upper limit value TMX is, for example, 85 Nm. The upper limit value TMX is determined by, for example, the output characteristics of the motor 38. The controller 62 is configured to control the motor 38 so that the assist power WM is less than or equal to an upper limit value WMX in a case where the output of the motor 38 is input to the first rotational body 24 and the assist force M is expressed by power.

The controller 62 can be configured to control the motor 38 in accordance with the rotational speed NC of the input rotational shaft 12A in addition to the human driving force H. For example, in a case where the rotational speed NC of the input rotational shaft 12A is less than a predetermined rotational speed NCX, the controller 62 stops driving the motor 38 in accordance with at least one of the rotational speed NC of the input rotational shaft 12A and the human driving force H. The predetermined rotational speed NCX is a speed in the range of 0 rpm or greater to 5 rpm. For example, the controller 62 can control the motor 38 so as to stop the motor 38 or decrease the assist force M in a case where the rotational speed NC of the input rotational shaft 12A is greater than or equal to a predetermined rotational speed NCY. The predetermined rotational speed NCY is greater than a certain rotational speed NC and is, for example, a speed in the range of 120 rpm to 200 rpm.

The controller 62 is configured to control the motor 38 in accordance with a parameter P related to at least one of the vehicle speed V of the human-powered vehicle 10, the inclination angle D of the human-powered vehicle 10, and the travel resistance R of the human-powered vehicle 10 in addition to the human driving force H. The parameter related to the travel resistance R includes at least one of inclination resistance, air resistance, rolling resistance of a tire, and acceleration resistance. The parameter related to the travel resistance R can include at least one, two, three, or all of inclination resistance, air resistance, rolling resistance of a tire, and acceleration resistance. The parameter related to the travel resistance R can include, for example, only inclination resistance. In this case, the wind speed detector, the tire pressure detector, and the acceleration detector can be omitted.

The travel resistance R includes at least one of inclination resistance, air resistance, rolling resistance of a tire, and acceleration resistance. The inclination resistance increases as the inclination angle D increases. The tire rolling resistance increases as the tire pressure decreases. The air resistance increases as the wind speed increases. The acceleration resistance increases as the acceleration of the human-powered vehicle 10 increases. The controller 62 controls the motor 38 in accordance with at least one of the inclination angle D detected by the inclination detector 48, the wind speed detected by the wind speed detector 50, the tire pressure detected by the tire pressure detector 52, and the acceleration detected by the acceleration detector 54.

The controller 62 is configured to control the motor 38 so as to increase the assist force M produced by the motor 38 for when the output of the motor 38 is maximal upon determining a parameter related to at least one of the vehicle speed V of the human-powered vehicle 10, the inclination angle D of the human-powered vehicle 10, and the travel resistance R of the human-powered vehicle 10 has increased. Preferably, the assist force M produced by the motor 38 for when the output of the motor 38 is maximal corresponds to the upper limit value MX. The controller 62 includes at least one of a first configuration example, a second configuration example, a third configuration example, and a fourth configuration example that are described below. The controller 62 can include at least one of the first configuration example, the second configuration example, the third configuration example, and the fourth configuration example. Alternatively, the controller 62 can include two, three, or four of these configurations.

In the first configuration example, the parameter P includes a first parameter P1 related to the vehicle speed V, and the controller 62 is configured to control the motor 38 so that the assist force M produced by the motor 38 is less than or equal to a first value M1 upon determining the vehicle speed V is lower than or equal to a first vehicle speed V1 and control the motor 38 so that the assist force M produced by the motor 38 is less than or equal to a second value M2 in a case where the vehicle speed V is higher than the first vehicle speed V1. The second value M2 is larger than the first value M1. The first parameter P1, which is related to the vehicle speed V, can be the vehicle speed V or acceleration. In a case where the first parameter P1 related to the vehicle speed V is acceleration, the controller 62 is configured to integrate the acceleration and calculate speed.

Preferably, in the first configuration example, the controller 62 is configured to control the motor 38 so that the assist force M produced by the motor 38 is less than or equal to a third value M3 upon determining the vehicle speed V is higher than a second vehicle speed V2. Preferably, the second vehicle speed V2 is higher than the first vehicle speed V1, and the third value M3 is smaller than the second value M2. Preferably, the third value M3 is smaller than the second value M2. The third value M3 can be equal to the second vehicle speed V2 or larger than the second vehicle speed V2. Preferably, the third value M3 decreases as the vehicle speed V increases. For example, the controller 62 stops the motor 38 upon determining the vehicle speed V becomes higher than a third vehicle speed V3, which is higher than the second vehicle speed V2. In a case where, for example, the vehicle speed V is higher than the second vehicle speed V2, the third value M3 decreases as the vehicle speed V increases and becomes 0 (zero) if the vehicle speed V becomes higher than the third vehicle speed V3. The third value M3 can be a constant value. Preferably, in the first configuration example, the controller 62 is configured to control the motor 38 so as to increase the assist force M produced by the motor 38 for when the output of the motor 38 is maximal as the parameter P increases upon determining the vehicle speed V is lower than or equal to the second vehicle speed V2. Preferably, in the first configuration example, the controller 62 is configured to control the motor 38 so as to increase the assist force M produced by the motor 38 for when the output of the motor 38 is maximal as the first parameter P1 increases upon determining the vehicle speed V is lower than or equal to the second vehicle speed V2. In the first configuration example, for instance, the controller 62 can be configured to control the motor 38 so as to fix the assist force M produced by the motor 38 for when the output of the motor 38 is maximal upon determining the vehicle speed V is lower than or equal to the second vehicle speed V2. In the first configuration example, the controller 62 can be configured to control the motor 38 so as to increase the assist force M produced by the motor 38 for when the output of the motor 38 is maximal as the vehicle speed V increases upon determining the vehicle speed V is lower than or equal to a fourth vehicle speed V4, which is lower than the first vehicle speed V1. The fourth vehicle speed V4 is, for example, a speed in the range of 0 (zero) kilometers per hour or higher and 15 kilometers per hour or less. The fourth vehicle speed V4 is, for example, 10 kilometers per hour. The first vehicle speed V1 is a speed in the range of 15 kilometers per hour or higher and 40 kilometers per hour or less. The first vehicle speed V1 is, for example, 25 kilometers per hour. The second vehicle speed V2 is a speed in the range of 40 kilometers per hour or higher and 50 kilometers per hour or less. The second vehicle speed V2 is, for example, 40 kilometers per hour.

A process for controlling the motor 38 with the controller 62 in the first configuration example will now be described with reference to FIG. 3. In a case where the controller 62 is supplied with electric power, the controller 62 starts the process and proceeds to step S11 of the flowchart illustrated in FIG. 3. Upon completion of the flowchart illustrated in FIG. 3, the controller 62 repeats the process from step S11 in predetermined cycles until the supply of electric power is stopped.

In step S11, the controller 62 determines whether the first parameter P1 is increasing. In a case where the first parameter P1 is not increasing, the controller 62 ends the process. In a case where the first parameter P1 is increasing, the controller 62 proceeds to step S12.

In step S12, the controller 62 determines whether the vehicle speed V is lower than or equal to the first vehicle speed V1. In a case where the vehicle speed V is lower than or equal to the first vehicle speed V1, the controller 62 proceeds to step S13. In step S13, the controller 62 controls the motor 38 so that the assist force M produced by the motor 38 is less than or equal to the first value M1.

In a case where the vehicle speed V is not lower than or equal to the first vehicle speed V1 in step S12, the controller 62 proceeds to step S14. In step S14, the controller 62 determines whether the vehicle speed V is higher than the second vehicle speed V2. In a case where the vehicle speed V is not higher than the second vehicle speed V2, the controller 62 proceeds to step S15. In step S15, the controller 62 controls the motor 38 so that the assist force M produced by the motor 38 is less than or equal to the second value M2.

In a case where the vehicle speed V is higher than the second vehicle speed V2 in step S14, the controller 62 proceeds to step S16. In step S16, the controller 62 controls the motor 38 so that the assist force M produced by the motor 38 is less than or equal to the third value M3.

Figure 4:
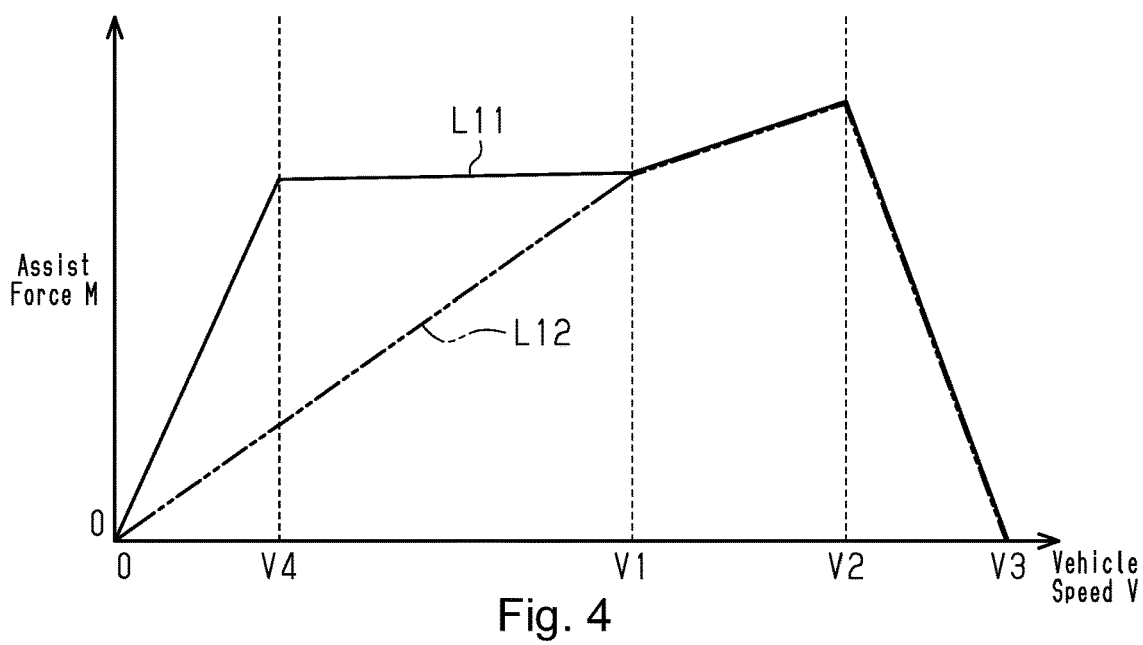
FIG. 4 is a graph showing the relationship of the vehicle speed and the assist force produced by the motor in the process for controlling the motor executed by the first configuration example of the electronic controller shown in FIG. 2.

In FIG. 4, solid line L11 and double-dashed line L12 show examples of the relationship of the vehicle speed V and the maximum assist force M produced by the motor 38 in the first configuration example.

(1) A case in which the controller 62 changes the maximum value of the assist force M as shown by solid line L11 will now be described. The maximum value of the assist force M increases as the vehicle speed V increases in a case where the vehicle speed V is in a range that is higher than or equal to 0 (zero) kilometers per hour and lower than or equal to the fourth vehicle speed V4. The maximum value of the assist force M is fixed in a case where the vehicle speed V is in a range that is higher than the fourth vehicle speed V4 and lower than or equal to the first vehicle speed V1. The maximum value of the assist force M increases as the vehicle speed V increases in a case where the vehicle speed V is in a range that is higher than the first vehicle speed V1 and lower than or equal to the second vehicle speed V2. The maximum value of the assist force M decreases as the vehicle speed V increases in a case where the vehicle speed V is in a range that is higher than the second vehicle speed V2 and lower than or equal to the third vehicle speed V3. The maximum value of the assist force M is 0 (zero) in a range that is higher than the third vehicle speed V3.

(2) A case in which the controller 62 changes the maximum value of the assist force M as shown by double-dashed line L12 will now be described. The maximum value of the assist force M increases as the vehicle speed V increases in a case where the vehicle speed V is in a range that is higher than or equal to 0 (zero) kilometers per hour and lower than or equal to the fourth vehicle speed V4. The maximum value of the assist force M increases as the vehicle speed V increases in a case where the vehicle speed V is in a range that is higher than the fourth vehicle speed V4 and lower than or equal to the first vehicle speed V1. The maximum value of the assist force M increases as the vehicle speed V increases in a case where the vehicle speed V is in a range that is higher than the first vehicle speed V1 and lower than or equal to the second vehicle speed V2. The maximum value of the assist force M decreases as the vehicle speed V increases in a case where the vehicle speed V is in a range that is higher than the second vehicle speed V2 and lower than or equal to the third vehicle speed V3. The maximum value of the assist force M is 0 (zero) in a range that is higher than the third vehicle speed V3. Preferably, the maximum value of the assist force M is set so that the ratio of a change in the assist force M to an increase in the vehicle speed V in a case where the vehicle speed V is in a range that is higher than the first vehicle speed V1 and lower than or equal to the second vehicle speed V2 is smaller than the ratio of a change in the assist force M to an increase in the vehicle speed V in a case where the vehicle speed V is in a range that is higher than the second vehicle speed V2 and lower than or equal to the third vehicle speed V3. The ratio of a change in the assist force M to an increase in the vehicle speed V in a case where the vehicle speed V is in a range that is higher than the first vehicle speed V1 and lower than or equal to the second vehicle speed V2 can be greater than or equal to the ratio of a change in the assist force M to an increase in the vehicle speed V in a case where the vehicle speed V is in a range that is higher than second vehicle speed V2 and lower than or equal to the third vehicle speed V3.

In the second configuration example, the parameter P includes the first parameter P1 that is related to the vehicle speed V and a second parameter P2 that is related to at least one of the inclination angle D and the travel resistance R. In the second configuration example, for example, the controller 62 is configured not to change the assist force M produced by the motor 38 for when the output of the motor 38 is maximal in a case where the second parameter P2 does not increase even if the first parameter P1 increases. Preferably, in a case where the second parameter P2 is a parameter other than the inclination angle D and the travel resistance R, the second parameter P2 increases as at least one of the inclination angle D and the travel resistance R increases.

In the second configuration example, for example, the controller 62 is configured to control the motor 38 in a first state and a second state. The controller 62 controls the motor 38 in the second state in a case where the first parameter P1 increases and the second parameter P2 increases. The controller 62 controls the motor 38 in the first state in a case where the first parameter P1 increases but the second parameter P2 does not increase. The controller 62 controls the motor 38 so that the assist force M produced by the motor 38 for when the output of the motor 38 is maximal in the first state differs from the assist force M produced by the motor 38 for when the output of the motor 38 is maximal in the second state. Preferably, the controller 62 controls the motor 38 so that the assist force M produced by the motor 38 for when the output of the motor 38 is maximal in the first state is less than the assist force M produced by the motor 38 for when the output of the motor 38 is maximal in the second state.

Figure 5:
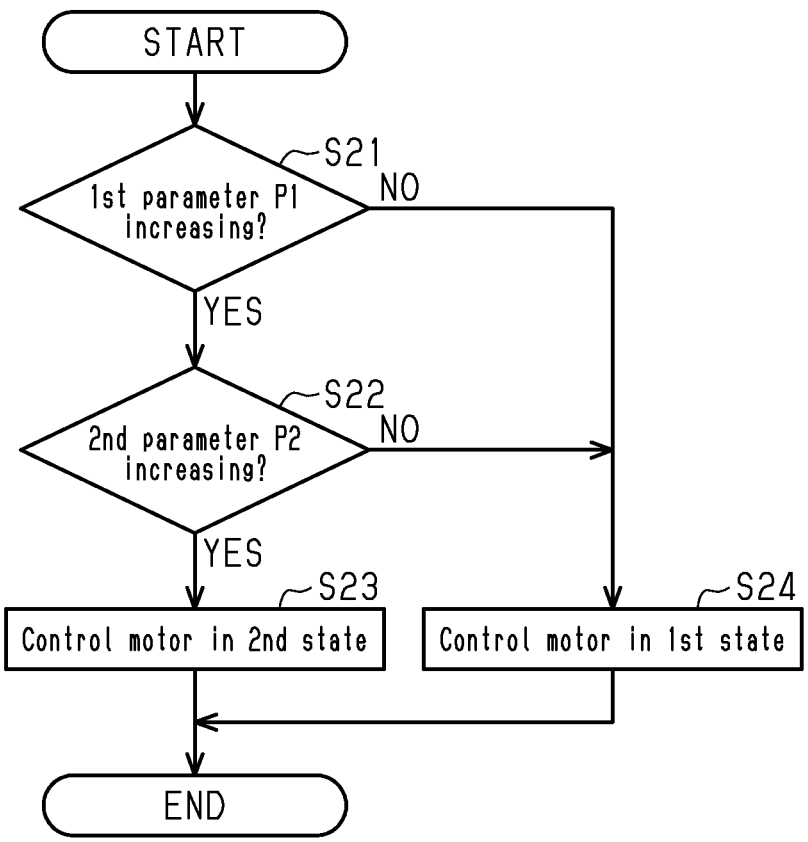
FIG. 5 is a flowchart of a process for controlling the motor executed by a second configuration example of the electronic controller shown in FIG. 2.

A process for controlling the motor 38 in the second configuration example will now be described with reference to FIG. 5. In a case where the controller 62 is supplied with electric power, the controller 62 starts the process and proceeds to step S21 of the flowchart illustrated in FIG. 5. Upon completion of the flowchart illustrated in FIG. 5, the controller 62 repeats the process from step S21 in predetermined cycles until the supply of electric power is stopped.

In step S21, the controller 62 determines whether the first parameter P1 is increasing. In a case where the first parameter P1 is increasing, the controller 62 proceeds to step S22. If the second parameter P2 is increasing in step S22, the controller 62 proceeds to step S23. In step S23, the controller 62 controls the motor 38 in the second state and then ends the process.

In a case where the first parameter P1 is not increasing in step S21, the controller 62 proceeds to step S24. In a case where the second parameter P1 is not increasing in step S22, the controller 62 proceeds to step S24. In step S24, the controller 62 controls the motor 38 in the first state and then ends the process.

In the third configuration example, the controller 62 is configured to control the motor 38 so that the assist force M produced by the motor 38 is less than or equal to a fourth value M4 in a case where the first parameter P1 is less than or equal to a first threshold value P1X and the second parameter P2 is less than or equal to a second threshold value P2X. Preferably, in the third configuration example, the controller 62 is configured to control the motor 38 so that the assist force M produced by the motor 38 is less than or equal to the fourth value M4 in a case where the first parameter P1 is greater than the first threshold value P1X and the second parameter P2 is less than or equal to the second threshold value P2X. Preferably, in the third configuration example, the controller 62 is configured to control the motor 38 so that the assist force M produced by the motor 38 is less than or equal to a fifth value M5 in a case where the first parameter P1 is greater than the first threshold value P1X and the second parameter P2 is greater than the second threshold value P2X. Preferably, in the third configuration example, the fifth value M5 is larger than the fourth value M4. In a case where the first parameter P1 is the vehicle speed V, for example, the first threshold value P1X is the first vehicle speed V1, the fifth value M5 is equal to the second value M2, and the fourth value M4 is equal to the first value M1.

Preferably, in the third configuration example, the controller 62 is configured to control the motor 38 so that the assist force M produced by the motor 38 is less than or equal to a seventh value M7 in a case where the first parameter P1 is greater than the first threshold value P1X and the second parameter P2 is less than or equal to the second threshold value P2X. The seventh value M7 can be larger than the fourth value M4, equal to the fourth value M4, or smaller than the fourth value M4. In a case where the first parameter P1 is the vehicle speed V, for example, the second threshold value P2X is the second vehicle speed V2.

Preferably, in the third configuration example, the controller 62 is configured to control the motor 38 so that the assist force M produced by the motor 38 is less than or equal to a sixth value M6 in a case where the first parameter P1 is greater than a third threshold value P1Y. Preferably, the third threshold value P1Y is larger than the first threshold value P1X, and the sixth value M6 is smaller than the fifth value M5. In a case where the first parameter P1 is the vehicle speed V, for example, the third threshold value P1Y is the third vehicle speed V3.

A process for controlling the motor 38 with the controller 62 in the third configuration example will now be described with reference to FIG. 6. In a case where the controller 62 is supplied with electric power, the controller 62 starts the process and proceeds to step S31 of the flowchart illustrated in FIG. 6. Upon completion of the flowchart illustrated in FIG. 6, the controller 62 repeats the process from step S31 in predetermined cycles until the supply of electric power is stopped.

In step S31, the controller 62 determines whether the first parameter P1 is greater than the third threshold value P1Y. In a case where the first parameter P1 is not greater than the third threshold value P1Y, the controller 62 proceeds to step S32. In step S32, the controller 62 determines whether the first parameter P1 is less than or equal to the first threshold value P1X. In a case where the first parameter P1 is less than or equal to the first threshold value P1X, the controller 62 proceeds to step S33.

In step S33, the controller 62 determines whether the second parameter P2 is less than or equal to the second threshold value P2X. In a case where the second parameter P2 is less than or equal to the second threshold value P2X, the controller 62 proceeds to step S34. In step S34, the controller 62 controls the motor 38 so that the assist force M produced by the motor 38 is less than or equal to the fourth value M4 and then ends the process.

In a case where the second parameter P2 is not less than or equal to the second threshold value P2X in step S33, the controller 62 proceeds to step S35. In step S35, the controller 62 controls the motor 38 so that the assist force M produced by the motor 38 is less than or equal to the seventh value M7 and then ends the process.

In a case where the first parameter P1 is not less than or equal to the first threshold value P1X in step S32, the controller 62 proceeds to step S36. In step S36, the controller 62 determines whether the second parameter P2 is less than or equal to the second threshold value P2X. In a case where the second parameter P2 is less than or equal to the second threshold value P2X, the controller 62 proceeds to step S37. In step S37, the controller 62 controls the motor 38 so that the assist force M produced by the motor 38 is less than or equal to the fourth value M4 and then ends the process.

In a case where the second parameter P2 is not less than or equal to the second threshold value P2X in step S36, the controller 62 proceeds to step S38. In step S38, the controller 62 controls the motor 38 so that the assist force M produced by the motor 38 is less than or equal to the fifth value M5 and then ends the process.

In a case where the first parameter P1 is greater than the third threshold value P1Y in step S31, the controller 62 proceeds to step S39. In step S39, the controller 62 controls the motor 38 so that the assist force M produced by the motor 38 is less than or equal to the sixth value M6 and then ends the process.

In the fourth configuration example, the controller 62 is configured to change the ratio A in accordance with the vehicle speed V. In the fourth configuration example, the controller 62 is configured to control the motor 38 so as to increase the ratio A of the assist force M produced by the motor 38 to the human driving force if the vehicle speed V of the human-powered vehicle 10 increases in a case where the vehicle speed V of the human-powered vehicle 10 is in a first range that is higher than 15 kilometers per hour. Preferably, in the fourth configuration example, the controller 62 is configured to control the motor 38 so as to increase the ratio A of the assist force M produced by the motor 38 to the human driving force H as the vehicle speed V of the human-powered vehicle 10 increases in a case where the vehicle speed V of the human-powered vehicle 10 is in the first range that is higher than 15 kilometers per hour. Preferably, in the fourth configuration example, the controller 62 is configured to control the motor 38 so as to decrease the ratio A if the vehicle speed V increases in a case where the vehicle speed V is in a second range that is higher than the first range. Preferably, in the fourth configuration example, the controller 62 is configured to control the motor 38 so as to decrease the ratio A as the vehicle speed V becomes higher in a case where the vehicle speed V is in the second range that is higher than the first range. Preferably, the second range includes the third vehicle speed V3. Preferably, in the fourth configuration example, the controller 62 is configured to control the motor 38 so as to decrease the ratio A in the second range as the third vehicle speed V3 approaches from the lower limit value of the second range and control the motor 38 so that the ratio A is 0 (zero) in a range greater than or equal to the third vehicle speed V3. Preferably, the second range includes a region higher than 25 kilometers per hour. Preferably, the first range includes a region lower than or equal to 25 kilometers. Preferably, the first range includes a region that is higher than 10 kilometers per hour and lower than or equal to 25 kilometers per hour. For example, the controller 62 can be configured to control the motor so as to increase the ratio A as the vehicle speed V increases in a case where the vehicle speed V is in a third range that is lower than the first range. Preferably, the second range is continuous with the first range. Preferably, the third range is continuous with the first range. The first range corresponds to, for example, a range that is higher than the first vehicle speed V1 and lower than or equal to the second vehicle speed V2. The second range corresponds to, for example, a range that is higher than the second vehicle speed V2.

Preferably, in the fourth configuration example, the controller 62 is configured to change the ratio A in a case where the vehicle speed V is in the first range in accordance with the parameter P related to at least one of the vehicle speed V of the human-powered vehicle 10, the inclination angle D of the human-powered vehicle 10, and the travel resistance R of the human-powered vehicle 10. In the fourth configuration example, the controller 62 is configured to fix the ratio A in a case where the vehicle speed V is in the first range. In the fourth configuration example, preferably, the parameter P includes at least one of the first parameter P1 related to the vehicle speed V, the second parameter P2 related to the inclination angle D, and a third parameter P3 related to the travel resistance R. The parameter P can include one, two, or three of the first parameter P1 related to the vehicle speed V, the second parameter P2 related to the inclination angle D, and the third parameter P3 related to the travel resistance R. In a case where the third parameter P3 is a parameter other than the travel resistance R, preferably, the third parameter P3 increases as the travel resistance R increases.

Preferably, in the fourth configuration example, the parameter P includes the first parameter P1, and the controller 62 is configured to control the motor 38 so as to increase the ratio A as the first parameter P1 increases in a case where the vehicle speed V is in the first range.

Preferably, in the fourth configuration example, the parameter P includes the second parameter P2, and the controller 62 is configured to control the motor 38 so as to increase the ratio A as the second parameter P2 increases in a case where the vehicle speed V is in the first range.

Preferably, in the fourth configuration example, the parameter P includes the third parameter P3, and the controller 62 is configured to control the motor 38 so that the ratio A increases as the third parameter P3 increases in a case where the vehicle speed V is in the first range.

Preferably, in the fourth configuration example, the parameter P includes the second parameter P2, and the controller 62 is configured not to change the ratio A even if the vehicle speed V of the human-powered vehicle 10 increases in a case where the vehicle speed V is in the first range and the second parameter P2 is less than or equal to a predetermined fourth threshold value P4X.

Preferably, in the fourth configuration example, the parameter P includes the third parameter P3, and the controller 62 is configured not to change the ratio A even if the vehicle speed V of the human-powered vehicle 10 increases in a case where the vehicle speed V is in the first range and the third parameter P3 is less than or equal to a fifth threshold value P5X.

A process for controlling the motor 38 with the controller 62 in the fourth configuration example will now be described with reference to FIG. 7. In a case where the controller 62 is supplied with electric power, the controller 62 starts the process and proceeds to step S41 of the flowchart illustrated in FIG. 7. Upon completion of the flowchart illustrated in FIG. 7, the controller 62 repeats the process from step S41 in predetermined cycles until the supply of electric power is stopped.

In step S41, the controller 62 determines whether the vehicle speed V is in the first range. The controller 62 proceeds to step S42 in a case where the vehicle speed V is in the first range. In step S42, the controller 62 determines whether the vehicle speed V is increasing. In a case where the vehicle speed V is increasing, the controller 62 proceeds to step S43. In step S43, the controller 62 controls the motor 38 so as to increase the ratio A.

In a case where the vehicle speed V is not increasing in step S42, the controller 62 proceeds to step S44. In step S44, the controller 62 changes the ratio A in accordance with the parameter P and then ends the process.

In a case where the vehicle speed V is not in the first range in step S41, the controller 62 proceeds to step S45. In step S45, the controller 62 determines whether the vehicle speed V is in the second range. In a case where the vehicle speed V is in the second range, the controller 62 proceeds to step S46. In step S46, the controller 62 determines whether the vehicle speed V is increasing. In a case where the vehicle speed V is increasing, the controller 62 proceeds to step S47. In step S47, the controller 62 controls the motor 38 so as to decrease the ratio A and then ends the process.

In a case where the vehicle speed V is not increasing in step S46, the controller 62 proceeds to step S48. In a case where the vehicle speed V is not in the second range in step S45, the controller 62 proceeds to step S48. In step S48, the controller 62 changes the ratio A in accordance with the parameter P and then ends the process.

Modifications

The description related with the above embodiment exemplifies, without any intention to limit, applicable forms of a control device for a human-powered vehicle according to the present disclosure. The human-powered vehicle control device for a human-powered vehicle according to the present disclosure is applicable to, for example, modifications of the above embodiment that are described below and combinations of at least two of the modifications that do not contradict each other. In the modifications described hereinafter, same reference numerals are given to those components that are the same as the corresponding components of the above embodiment. Such components will not be described in detail.

Figure 8:
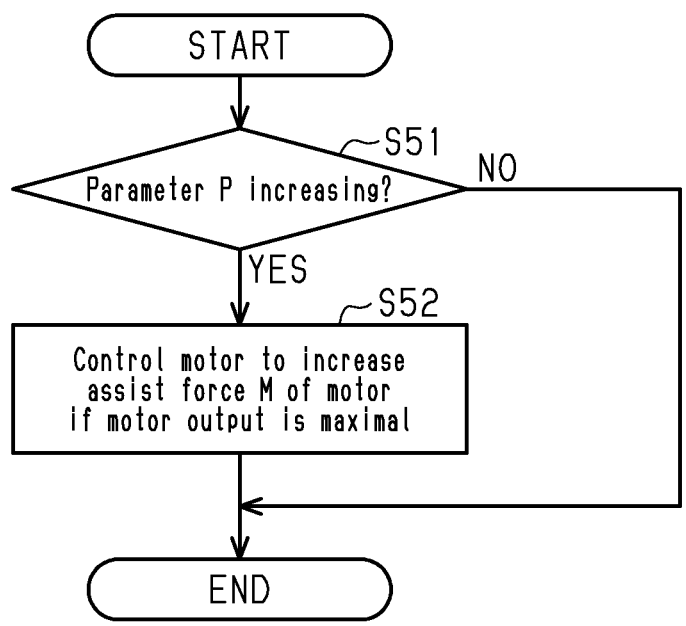
FIG. 8 is a flowchart of a process for controlling the motor executed by the electronic controller shown in FIG. 2 in accordance with one modification.

As long as the controller 62 is configured to control the motor 38 so as to increase the assist force M produced by the motor 38 for when the output of the motor 38 is maximal in a case where the parameter P related to at least one of the vehicle speed V of the human-powered vehicle 10, the inclination angle D of the human-powered vehicle 10, and the travel resistance R of the human-powered vehicle 10 is increased, elements irrelevant to such a configuration can be omitted. For example, the controller 62 executes the process of the flowchart illustrated in FIG. 8. In a case where the controller 62 is supplied with electric power, the controller 62 starts the process and proceeds to step S51 of the flowchart illustrated in FIG. 8. Upon completion of the flowchart illustrated in FIG. 8, the controller 62 repeats the process from step S51 in predetermined cycles until the supply of electric power is stopped. In step S51, the controller 62 determines whether the parameter P is increasing. In a case where the parameter P is not increasing, the controller 62 ends the process. In a case where the parameter P is increasing, the controller 62 proceeds to step S52. In step S52, the controller 62 controls the motor 38 so as to increase the assist force M produced by the motor 38 for when the output of the motor 38 is maximal. In the flowchart of FIG. 8, in a case where the determination of step S51 is NO, the controller 62 controls the motor 38 so that, for example, the assist force M produced by the motor 38 for when the output of the motor 38 is maximal becomes less than or equal to a predetermined value. In step S52 of the flowchart illustrated in FIG. 8, the controller 62 controls the motor 38 so as to increase the assist force M produced by the motor 38 for when the output of the motor 38 is maximal, for example, from a case where the determination of step S51 is NO.

As long as the controller 62 controls the motor 38 so as to increase the ratio A of the assist force M produced by the motor 38 to the human driving force H as the vehicle speed V of the human-powered vehicle 10 increases in a case where the vehicle speed V of the human-powered vehicle 10 is in the first range that is higher than 15 kilometers per hour, elements irrelevant to such a configuration can be omitted. For example, in the flowchart of FIG. 7, steps S42, S44, S45, S46, S47, and S48 can be omitted. In a case where the determination of step S41 is NO, the controller 62 ends the process. In a case where the determination of step S41 is YES, the controller 62 proceeds to step S43.

Figure 7:
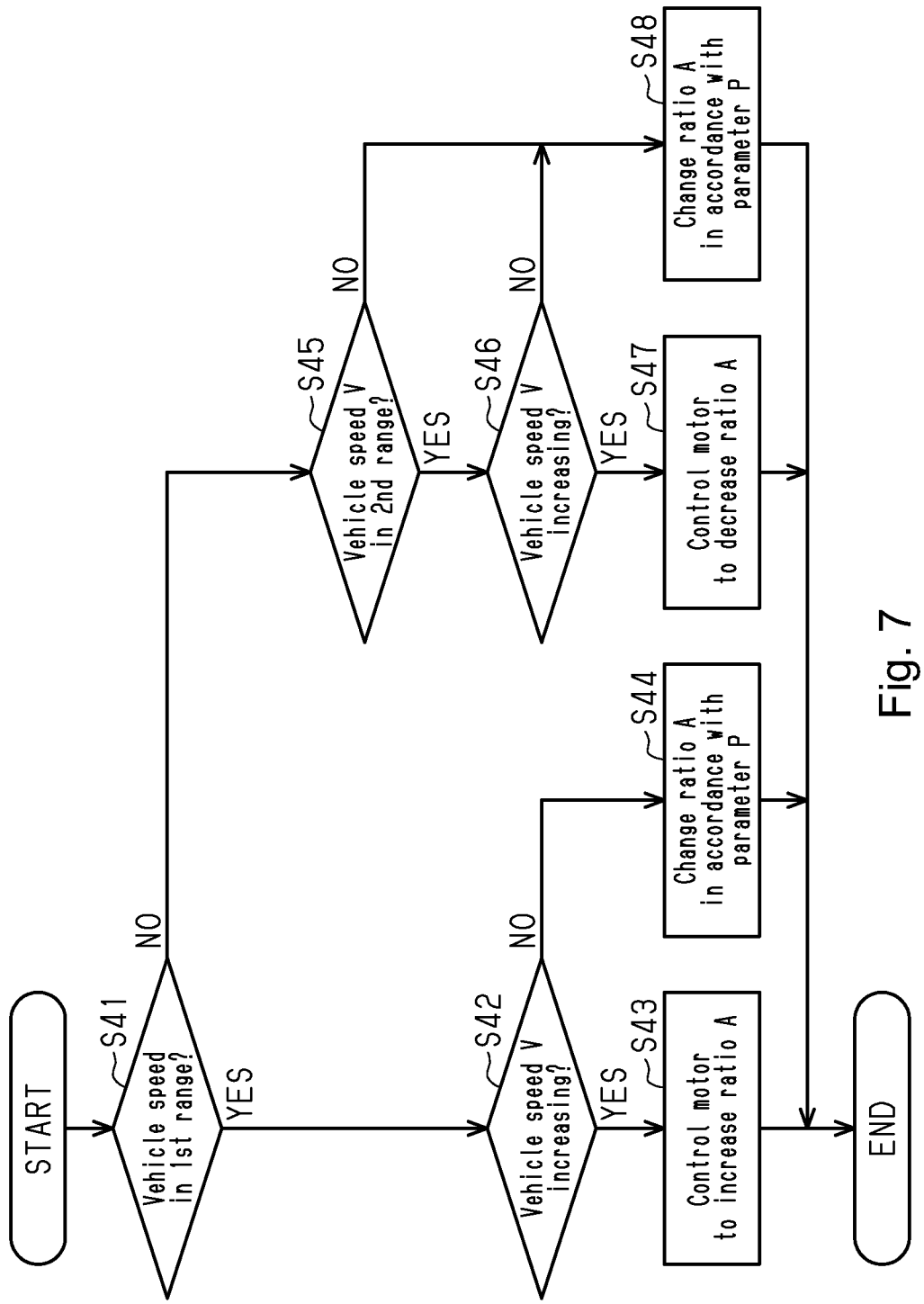
FIG. 7 is a flowchart of a process for controlling the motor executed by a fourth configuration example of the electronic controller shown in FIG. 2.

In the flowchart of FIG. 7, steps S42, S43, S44, S46, and S48 can be omitted. In a case where steps S42, S43, S44, S46, and S48 are omitted from the flowchart of FIG. 7, elements corresponding to the omitted steps can be omitted from the controller 62. In a case where the determination of step S41 is YES, the controller 62 ends the process. In a case where the determination of step S45 is YES, the controller 62 proceeds to step S47. In a case where the determination of step S45 is NO, the controller 62 ends the process.

In the flowchart of FIG. 7, steps S45, S46, S47, and S48 can be omitted. In a case where steps S45, S46, S47, and S48 are omitted from FIG. 7, elements corresponding to the omitted steps can be omitted from the controller 62. In a case where the determination of step S41 is NO, the controller 62 ends the process.

Figure 6:
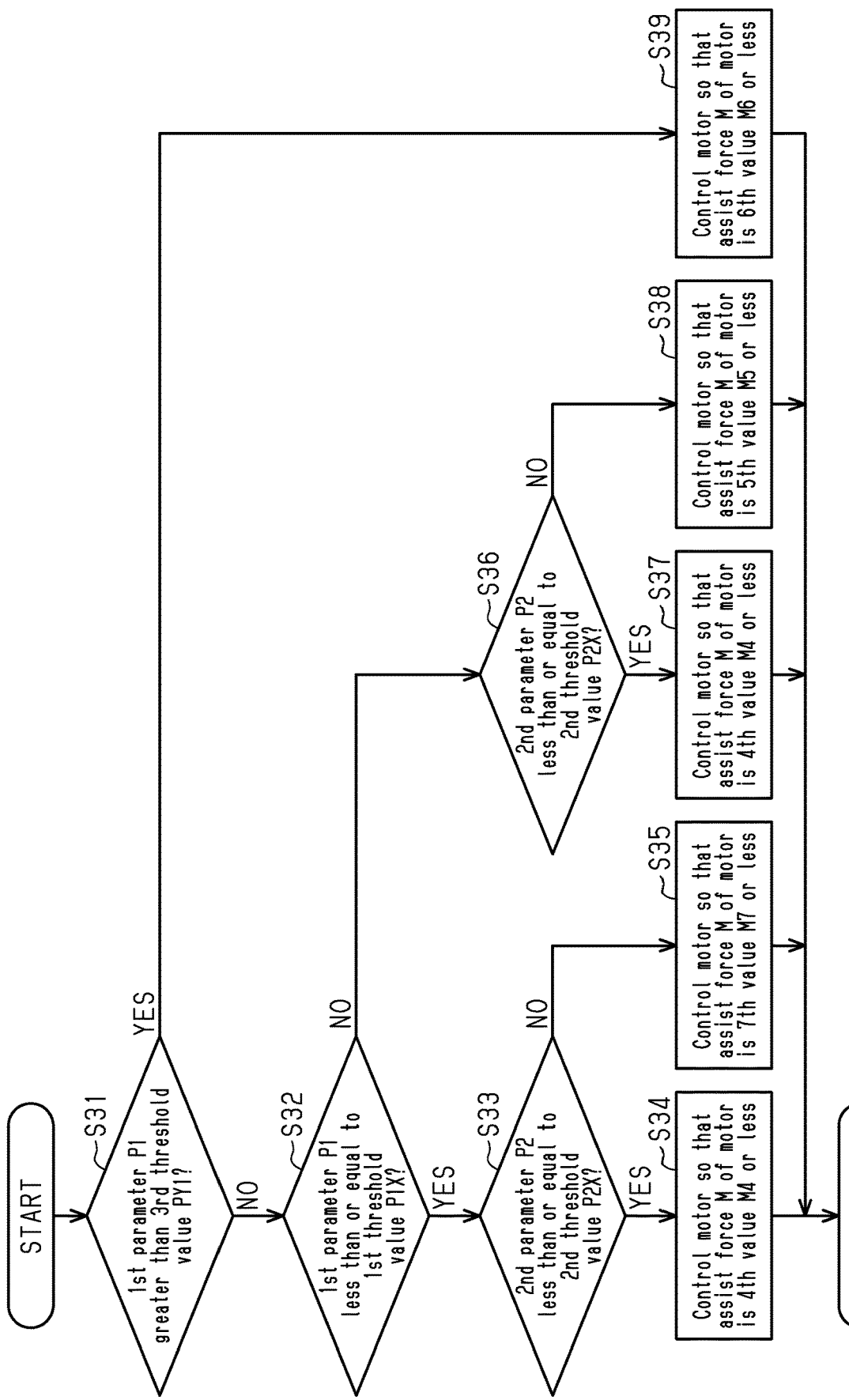
FIG. 6 is a flowchart of a process for controlling the motor executed by a third configuration example of the electronic controller shown in FIG. 2.

In the flowchart of FIG. 6, steps S31 and S39 can be omitted. In a case where steps S31 and S39 are omitted from FIG. 6, elements corresponding to the omitted steps can be omitted from the controller 62. In this case, in a case where the controller 62 is supplied with electric power, the controller 62 starts the process and proceeds to step S32 of the flowchart illustrated in FIG. 6.

Figure 3:
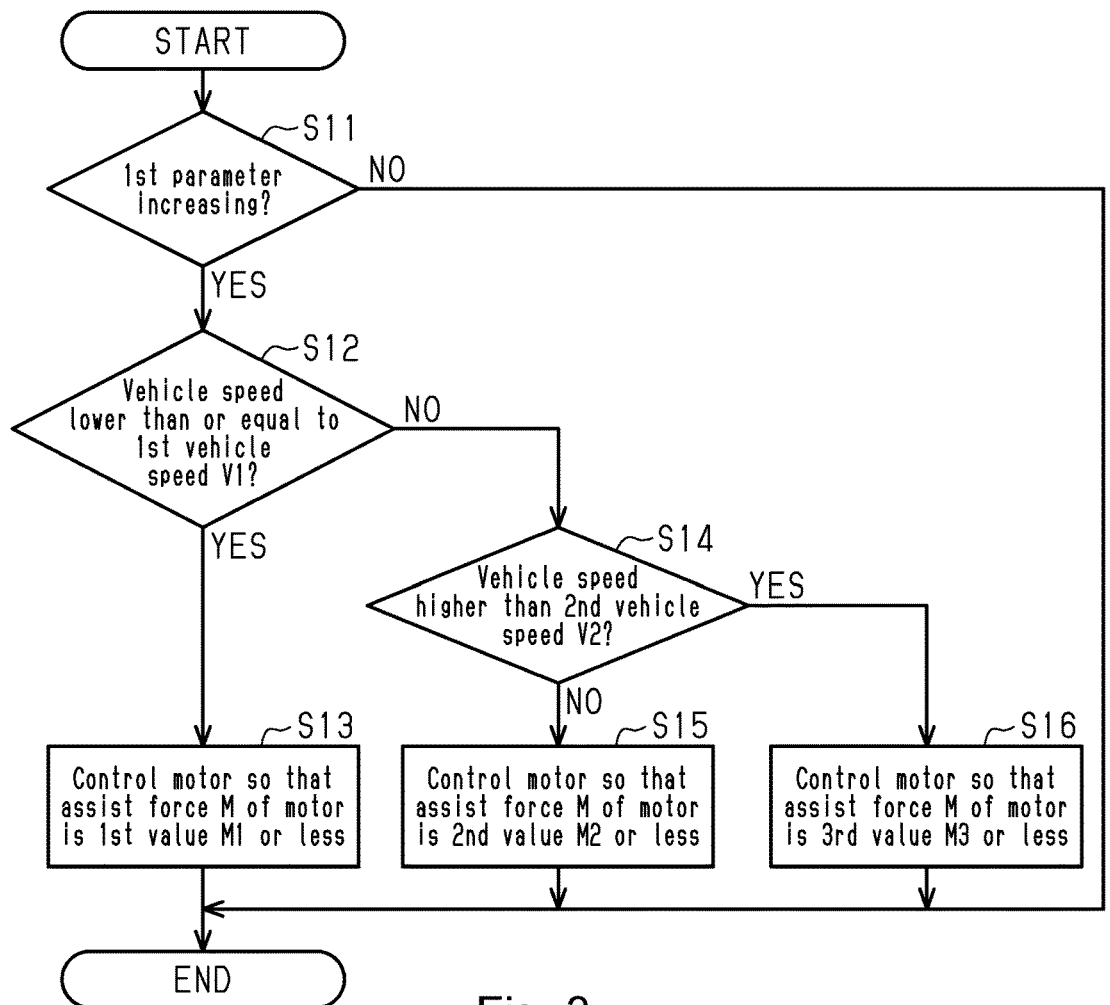
FIG. 3 is a flowchart of a process for controlling a motor executed by a first configuration example of an electronic controller shown in FIG. 2.

In the flowchart of FIG. 3, steps S14 and S16 can be omitted. In a case where steps S14 and S16 are omitted from FIG. 3, elements corresponding to the omitted steps can be omitted from the controller 62. In a case where the determination of step S12 is NO, the controller 62 proceeds to step S15.

In the specification, if a term used to define a numerical range includes a boundary value, the term can be changed to exclude the boundary value. If a term used to define a numerical range excludes a boundary valve, the term can be changed to include the boundary value. For example, the term "less than or equal to" can be changed to "less than." For example, "less than" can be changed to "less than or equal to." For example, "greater than or equal to" can be changed to "greater than." For example, "greater than" can be changed to "greater than or equal to."

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, the phrase "at least one of" as used in this disclosure means "only one single choice" or "any combination of two or more choices" if the number of its choices is three or more.

What is claimed is:

1. A human-powered vehicle control device for a human-powered vehicle, the human-powered vehicle control device comprising:
    an electronic controller configured to control a motor, which applies a propulsion force to a human-powered vehicle, in correspondence with a human driving force input to the human-powered vehicle,
    the electronic controller being configured to control the motor so as to increase an assist force produced by the motor for when an output of the motor is maximal upon determining a parameter related to at least one of a vehicle speed of the human-powered vehicle, an inclination angle of the human-powered vehicle, and a travel resistance of the human-powered vehicle has increased,
    the parameter including a first parameter related to the vehicle speed and a second parameter related to at least one of the inclination angle and the travel resistance, and
    the electronic controller being configured not to change the assist force produced by the motor for when the output of the motor is maximal upon determining the second parameter does not increase even if the first parameter increases.

2. The human-powered vehicle control device according to claim 1, wherein
    the parameter includes a first parameter related to the vehicle speed,
    the electronic controller is configured to control the motor so that the assist force produced by the motor is less than or equal to a first value upon determining the vehicle speed is lower than or equal to a first vehicle speed, the electronic controller is configured to control the motor so that the assist force produced by the motor is less than or equal to a second value upon determining the vehicle speed is higher than the first vehicle speed, and the second value is larger than the first value.

3. The human-powered vehicle control device according to claim 2, wherein the electronic controller is configured to control the motor so that the assist force produced by the motor is less than or equal to a third value upon determining the vehicle speed is higher than a second vehicle speed, the second vehicle speed is higher than the first vehicle speed, and the third value is smaller than the second value.

4. The human-powered vehicle control device according to claim 3, wherein the third value decreases as the vehicle speed increases.

5. The human-powered vehicle control device according to claim 3, wherein the electronic controller is configured to control the motor so as to increase the assist force produced by the motor for when the output of the motor is maximal as the parameter increases upon determining the vehicle speed is less than or equal to the second vehicle speed.

6. A human-powered vehicle control device for a human-powered vehicle, the human-powered vehicle control device comprising:

an electronic controller configured to control a motor, which applies a propulsion force to a human-powered vehicle, in correspondence with a human driving force input to the human-powered vehicle, the electronic controller being configured to control the motor so as to increase an assist force produced by the motor for when an output of the motor is maximal upon determining a parameter related to at least one of a vehicle speed of the human-powered vehicle, an inclination angle of the human-powered vehicle, and a travel resistance of the human-powered vehicle has increased, the parameter including a first parameter related to the vehicle speed and a second parameter related to at least one of the inclination angle and the travel resistance, the electronic controller being configured to control the motor so that the assist force produced by the motor is less than or equal to a first value upon determining the vehicle speed is lower than or equal to a first vehicle speed, the electronic controller being configured to control the motor so that the assist force produced by the motor is less than or equal to a second value upon determining the vehicle speed is higher than the first vehicle speed, the second value being larger than the first value, and the electronic controller being configured not to change the assist force produced by the motor for when the output of the motor is maximal upon determining the second parameter does not increase even if the first parameter increases.

7. The human-powered vehicle control device according to claim 1, wherein the electronic controller is configured to control the motor so that the assist force produced by the motor is less than or equal to a fourth value upon determining the first parameter is less than or equal to a first threshold value and the second parameter is less than or equal to a second threshold value, the electronic controller is configured to control the motor so that the assist force produced by the motor is less than or equal to the fourth value if the first parameter is greater than the first threshold value upon determining the second parameter is less than or equal to the second threshold value, the electronic controller is configured to control the motor so that the assist force produced by the motor is less than or equal to a fifth value if the first parameter is greater than the first threshold value upon determining the second parameter is greater than the second threshold value, and the fifth value is larger than the fourth value.

8. The human-powered vehicle control device according to claim 7, wherein the electronic controller is configured to control the motor so that the assist force produced by the motor is less than or equal to a sixth value upon determining the first parameter is greater than a third threshold value, the third threshold value is larger than the first threshold value, and the sixth value is smaller than the fifth value.

9. A human-powered vehicle control device for a human-powered vehicle, the human-powered vehicle control device comprising:

an electronic controller configured to control a motor, which applies a propulsion force to a human-powered vehicle, in correspondence with a human driving force input to the human-powered vehicle, the controller being configured to control the motor so as to increase a ratio of an assist force produced by the motor to the human driving force if a vehicle speed of the human-powered vehicle increases upon determining the vehicle speed of the human-powered vehicle is in a first range that is higher than 15 kilometers per hour.

10. The human-powered vehicle control device according to claim 9, wherein the electronic controller is configured to control the motor so as to decrease the ratio as the vehicle speed increases upon determining the vehicle speed is in a second range that is higher than the first range.

11. The human-powered vehicle control device according to claim 10, wherein the second range includes a region that is higher than 25 kilometers per hour.

12. The human-powered vehicle control device according to claim 9, wherein the electronic controller is configured to change the ratio in correspondence with a parameter related to at least one of a vehicle speed of the human-powered vehicle, an inclination angle of the human-powered vehicle, and a travel resistance of the human-powered vehicle upon determining the vehicle speed is in the first range.

13. The human-powered vehicle control device according claim 12, wherein the parameter includes at least one of a first parameter related to the vehicle speed, a second parameter related to the inclination angle, and a third parameter related to the travel resistance.

14. The human-powered vehicle control device according to claim 13, wherein the parameter includes the first parameter, and the electronic controller is configured to control the motor so as to increase the ratio as the vehicle speed increases upon determining the vehicle speed is in the first range.

15. The human-powered vehicle control device according to claim 13, wherein
the parameter includes the second parameter, and
the electronic controller is configured to control the motor so as to increase the ratio as the vehicle speed increases upon determining the vehicle speed is in the first range.

16. The human-powered vehicle control device according to claim 13, wherein
the parameter includes the third parameter, and
the electronic controller is configured to control the motor so as to increase the ratio as the third parameter increases upon determining the vehicle speed is in the first range.

17. The human-powered vehicle control device according to claim 13, wherein
the parameter includes the second parameter, and
the electronic controller is configured not to change the ratio even if the vehicle speed of the human-powered vehicle increases upon determining the vehicle speed is in the first range and the second parameter is less than or equal to a predetermined fourth threshold value.

18. The human-powered vehicle control device according to claim 13, wherein
the parameter includes the third parameter, and
the electronic controller is configured not to change the ratio even if the vehicle speed of the human-powered vehicle increases upon determining the vehicle speed is in the first range and the third parameter is less than or equal to a fifth threshold value.

\* \* \* \* \*